United States Patent
Kirihara et al.

(10) Patent No.: US 7,496,233 B2
(45) Date of Patent: Feb. 24, 2009

(54) SERVICE PROCESSING APPARATUS AND SERVICE PROCESSING METHOD

(75) Inventors: Kazuko Kirihara, Ebina (JP); Yuji Hikawa, Ebina (JP); Yukio Tajima, Ebina (JP); Akihiro Enomoto, Ebina (JP); Hidekazu Ozawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1183 days.

(21) Appl. No.: 10/661,505

(22) Filed: Sep. 15, 2003

(65) Prior Publication Data

US 2004/0194010 A1    Sep. 30, 2004

(30) Foreign Application Priority Data

Mar. 24, 2003   (JP) .............................. 2003-079267

(51) Int. Cl.
 *G06K 9/72*  (2006.01)
(52) U.S. Cl. ...................... 382/229; 709/219; 709/201; 715/255; 715/500
(58) Field of Classification Search ................ 382/229; 709/219, 201; 715/255, 500
See application file for complete search history.

(56) References Cited

U.S. PATENT DOCUMENTS

| | | | | |
|---|---|---|---|---|
| 5,235,433 A | * | 8/1993 | Clarkson et al. | 358/434 |
| 5,535,322 A | * | 7/1996 | Hecht | 705/1 |
| 5,767,985 A | * | 6/1998 | Yamamoto et al. | 358/402 |
| 5,966,451 A | * | 10/1999 | Utsumi | 380/51 |
| 6,134,594 A | * | 10/2000 | Helland et al. | 709/229 |
| 6,195,677 B1 | * | 2/2001 | Utsumi | 709/201 |
| 6,993,565 B1 | * | 1/2006 | Ohashi | 709/208 |
| 7,114,158 B1 | * | 9/2006 | Thompson et al. | 718/106 |
| 7,433,868 B1 | * | 10/2008 | Satomi et al. | 707/5 |
| 2002/0019836 A1 | * | 2/2002 | Uchio et al. | 707/511 |
| 2003/0066028 A1 | * | 4/2003 | Payne et al. | 715/500 |
| 2004/0057065 A1 | * | 3/2004 | Michimura et al. | 358/1.13 |
| 2004/0139115 A1 | * | 7/2004 | Schmidt et al. | 707/104.1 |
| 2004/0239981 A1 | * | 12/2004 | Ducato et al. | 358/1.15 |
| 2008/0148146 A1 | * | 6/2008 | Estrada et al. | 715/255 |

FOREIGN PATENT DOCUMENTS

| | | |
|---|---|---|
| JP | A 2-297632 | 12/1990 |
| JP | 09-146731 | 6/1997 |
| JP | A 9-223097 | 8/1997 |
| JP | A 10-83263 | 3/1998 |

(Continued)

*Primary Examiner*—Brian Q Le
*Assistant Examiner*—Aklilu k Woldemariam
(74) *Attorney, Agent, or Firm*—Oliff & Berridge, PLC

(57) ABSTRACT

A user defines a job flow of desired service cooperation according to a GUI screen displayed on a client terminal where parallel processing of plural parallel-executable jobs can be set. According to the thus-defined job flow, an instruction data generation server generates instruction data defining the content of processes, a storage location of a document as a subject, and other items. When the user selects desired one of the instruction data, the selected instruction data is sent to a cooperative processing server. The cooperative processing server interprets the instruction data and makes a service processing apparatus execute plural processes in cooperation by sending the respective service processing apparatuses processing requests that are formed so that a document will be processed according to the content of processes and processing order that are described in the instruction data

13 Claims, 13 Drawing Sheets

FOREIGN PATENT DOCUMENTS

| JP | A 11-170627 | 6/1999 |
| JP | A 2001-216452 | 8/2001 |
| JP | 2002-149372 | 5/2002 |
| JP | 2002-154691 | 5/2002 |
| JP | 2002-297404 | 10/2002 |
| JP | A 2004-287859 | 10/2004 |

* cited by examiner

FIG. 5

| SERVICE CLASS |
| --- |
| SERVICE NAME |
| SERVICE ICON |
| SERVICE INFORMATION LOCATION |
| INPUT |
| OUTPUT |
| PARAMETER RESTRICTION RULES |
| SERVICE LOCATION |
| METHOD NAME |
| INVOCATION SCHEME |
| IMPLICIT ELEMENTS |
| FLOW<br>(INVOCATION, MAP, METHOD)<br>(CONTROL STRUCTURE, LOGICAL OPERATIONS) |

FIG. 9

```
......  ← PARAMETERS, ETC. NECESSARY FOR OCR PROCESS
<para>
<faxsnd>  ← PARAMETERS, ETC. NECESSARY FOR FACSIMILE TRANSMISSION PROCESS
...
</faxsnd>
<mailsnd>  ← PARAMETERS, ETC. NECESSARY FOR MAIL TRANSMISSION PROCESS
...
</mailsnd>
<print>  ← PARAMETERS, ETC. NECESSARY FOR PRINTING PROCESS
...
</print>
</para>
<report>  ← PARAMETERS, ETC. NECESSARY FOR REPORT OUTPUT PROCESS
...
</report>
...
```

... — PARAMETERS, ETC. NECESSARY FOR OCR PROCESS

<faxsnd>
... — PARAMETERS, ETC. NECESSARY FOR FACSIMILE TRANSMISSION PROCESS
</faxsnd>
<mailsnd>
... — PARAMETERS, ETC. NECESSARY FOR MAIL TRANSMISSION PROCESS
</mailsnd>
<print>
... — PARAMETERS, ETC. NECESSARY FOR PRINTING PROCESS
</print>
<report>
... — PARAMETERS, ETC. NECESSARY FOR REPORT OUTPUT PROCESS
</report>
...
```

SERVICE PROCESSING APPARATUS AND SERVICE PROCESSING METHOD

BACKGROUND OF THE INVENTION

1. Field of the Invention

The present invention relates to a service processing apparatus and a service processing method. In particular, the invention relates to a service processing apparatus and a service processing method that are suitable for use in a work flow system that construct a work flow by electronizing a paper document.

2. Description of the Related Art

Conventionally, composite machines have been proposed in which facsimile, scanner, and printer functions are incorporated in a copier. Composite machine of this type enable cooperation between paper-based office work using a copier, a facsimile machine, etc. and processing on an electronized document that is performed on a personal computer. More specifically, it becomes possible to scan a paper document and transfer resulting document data to a personal computer and to send a document received by a facsimile machine to a personal computer in the form of image data as received without printing out the document.

It is desirable that an electronized document of a paper document or a facsimile-received document be subjected automatically to many cooperative procedures and processes. To this end, conventionally, techniques have been proposed in which job templates are prepared in advance that describe desired settings for items to be set in a composite machine. A job template is designated and a process is executed after changing the setting values if necessary.

For example, in a conventional image forming apparatus disclosed in JP-A-10-83263 (pages 5-7 and FIGS. 2 and 5 ), plural output setting data (job templates) that define output formats are stored and an image can be formed and output in an output format according to selected output setting date.

However, in the above image forming apparatus, the subject of setting is only the "output format", that is, only the function of the apparatus itself. Therefore, with this image forming apparatus, setting cannot be made for another apparatus such as a printer or a scanner that is connected to a network or cooperation between plural processes. This naturally raises a problem that plural processes cannot be executed efficiently by setting their processing order etc.

SUMMARY OF THE INVENTION

The present invention has been made in view of the above circumstances, and provides a service processing apparatus and a service processing method that can set the processing order of plural processes to be executed to document data so that they will be executed serially and/or in parallel, and enable plural apparatus connected to a network to execute plural processes in cooperation.

A service processing apparatus according to one aspect of the invention includes a setting unit for setting at least a location of processing document data and a content of the plural service processes to be executed on the document data and for setting processing order of the plural service processes so that they will be executed serially and/or in parallel; a generating unit for generating, on the basis of a content of settings made by the setting unit, instruction data to be used for executing the plural service processes on the document data in the processing order set by the setting unit; a interpreting unit for interpreting a content of the instruction data; and a cooperative processing unit for causing, on the basis of interpretation on results of the interpreting unit, the plural service processing apparatus connected to a network to execute the plural service processes on the document data in a cooperative manner.

A service processing method according to another aspect of the invention includes a setting step of setting at least a location of processing document data and a content of the plural service processes to be executed on the document data, and for setting processing order of the plural service processes so that they will be executed serially and/or in parallel; a generating step of generating, on the basis of a content of settings made by the setting step, instruction data to be used for executing the plural service processes on the document data in the processing order set by the setting step; an interpreting step of interpreting a content of the instruction data; and a cooperative processing step of causing, on the basis of interpretation results of the interpreting step, the plural service processing apparatus connected to a network to execute the plural service processes on the document data in a cooperative manner.

A service processing apparatus according to still another aspect of the invention includes a setting unit for setting at least a location of processing document data and a content of the plural service processes to be executed on the document data, and for setting processing order of the plural service processes so that they will be executed serially and/or in parallel; a generating unit for generating, on the basis of a content of settings made by the setting unit, instruction data to be used for executing the plural service processes on the document data in the processing order set by the setting unit; a interpreting unit for interpreting a content of the instruction data; a process executing unit for executing a service process on the document data on the basis of interpretation results of the interpreting unit; and a sending unit for sending the instruction data to a service processing apparatus for executing a next service process after the process executing unit has finished execution of the service process.

A service processing method according to a further aspect of the invention includes a setting step of setting at least a location of processsing document data and a content of the plural service processes to be end on the document data, and for setting processing order of the plural service processes so that they will be executed serially and/or in parallel; a generating step of generating, on the basis of a content of settings made by the setting step, instruction data to be used for executing the plural service processes on the document data in the processing order set by the setting step; an interpreting step of interpreting a content of the instruction data; a process executing step of executing a service process on the document data on the basis of interpretation results of the interpreting step; and a sending step of sending the instruction data to a service processing apparatus for executing a next service process after the process executing unit has finished execution of the service process.

BRIEF DESCRIPTION OF THE DRAWINGS

A preferred embodiment of the present invention will be described in detail based on the following figures, wherein:

FIG. 5 shows the structure of instruction data that has been generated by an instruction data generation server;

FIG. 9 shows the details of exemplary instruction data;

FIG. 12 the details of exemplary instruction data;

DESCRIPTION OF THE PREFERRED EMBODIMENT

A preferred embodiment of the present invention will be hereinafter described in detail with reference to the drawings.

[System Configuration]

Figure 1:
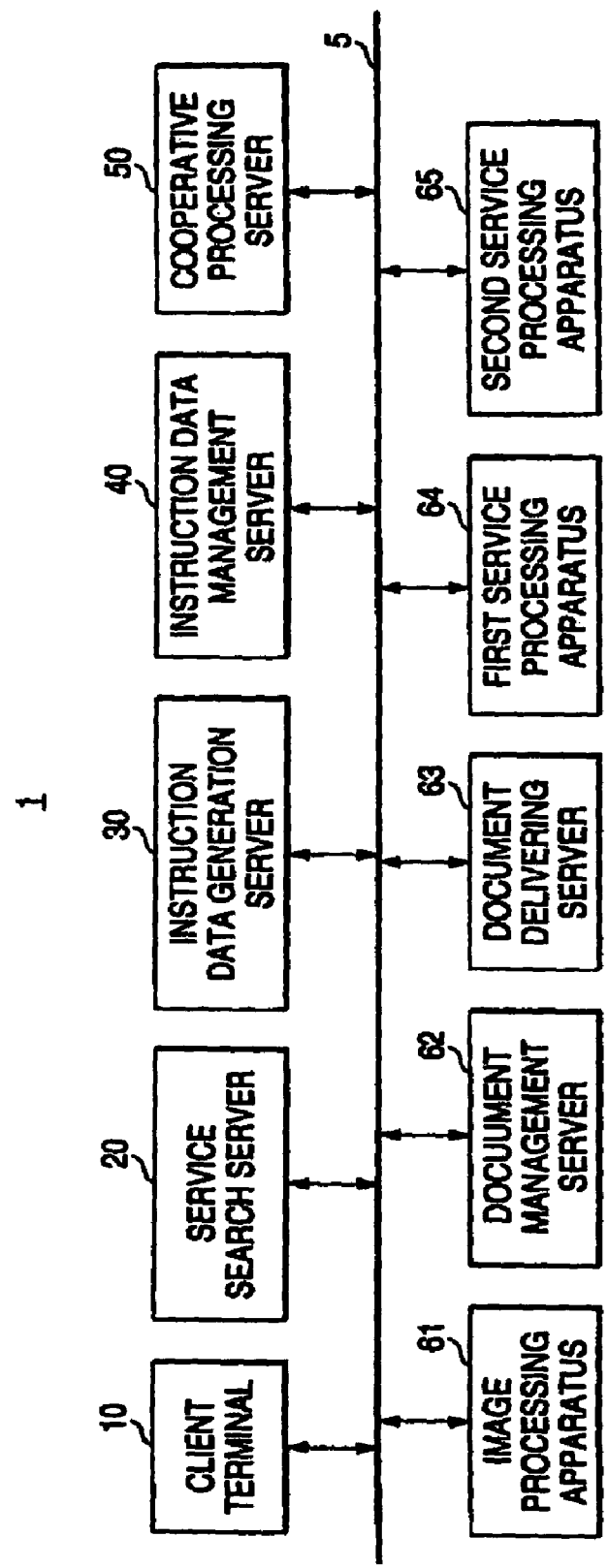
FIG. 1 is a block diagram showing the configuration of a document processing system according to an embodiment of the invention.

FIG. 1 is a block diagram showing the configuration of a document processing system 1 according to an embodiment of the invention.

The document processing system 1 is configured in such a manner that apparatus and applications for performing various services are connected to each other via a network 5. The term "service" unit a document-related function that can be used in response to an external request. The service may be of any kind and may be copying, printing, scanning, facsimile sending and reception, mail delivery, storage in a repository, reading from a repository, OCR (optical character recognition) processing, noise elimination processing, or the like.

Specifically, the document processing system 1 is equipped with a client terminal 10 having a user interface for ordering execution of a process desired by a user through cooperation between plural services, a service search server 20 for searching for a service desired by a user, an instruction data generation server 30 for generating instruction data on the basis of information relating to service cooperation that is specified by the client terminal 10, an instruction data management server 40 for managing instruction data, and a cooperative processing server 50 for executing a cooperative process of services according to instruction data.

The document processing system 1 is also equipped with an image processing apparatus 61 for performing image processing such as noise elimination processing, image rotation processing, and OCR processing on an image document and image binding, a document management server 62 for managing documents, a document delivering server 63 for delivering a document, a first service processing apparatus 64 for executing a first service process, and a second service processing apparatus 65 for executing a second service press.

Although the document processing system 1 according to this embodiment is configured in such a manner that the plural servers for executing respective prescribed service processes are connected to each other via the network 5, no particular limitations are imposed on the system configuration except that plural services should be connected to each other via a network.

The term "instruction data" unit data including, when a process flow is decomposed into plural functional processing steps, information indicating relationships between the functions, interface (I/F) information to be used for calling each function, and information to be used for constituting a graphical user interface (GUI) relating to the process flow.

Figure 2:
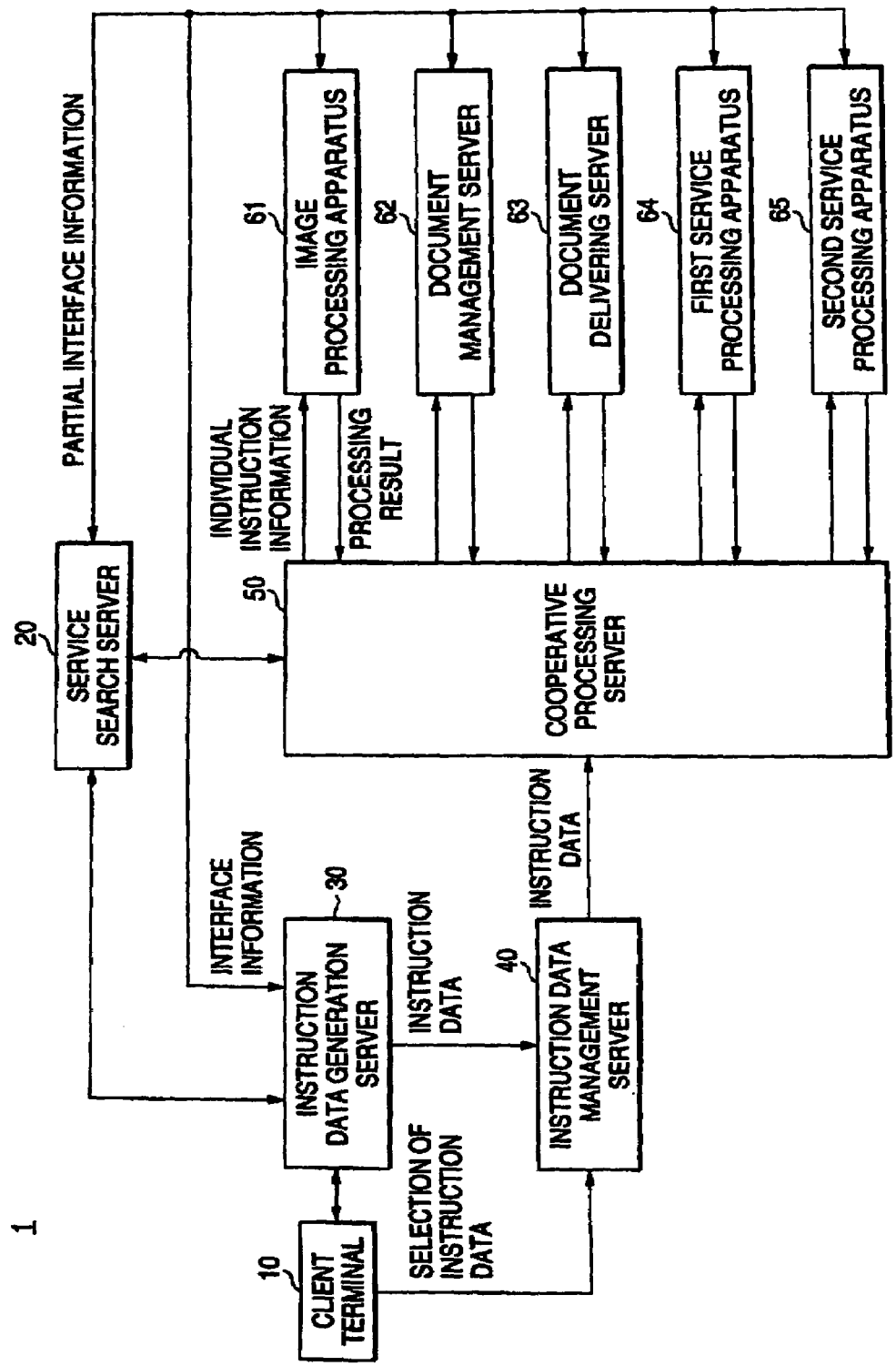
FIG. 2 is a block diagram showing a flow of information between apparatus constituting the document processing system.

FIG. 2 is a block diagram showing mutual relations between the service processing apparatus constituting the document processing system 1. Each service processing apparatus contains I/F information indicating the content of a service provided by itself.

Figure 3:
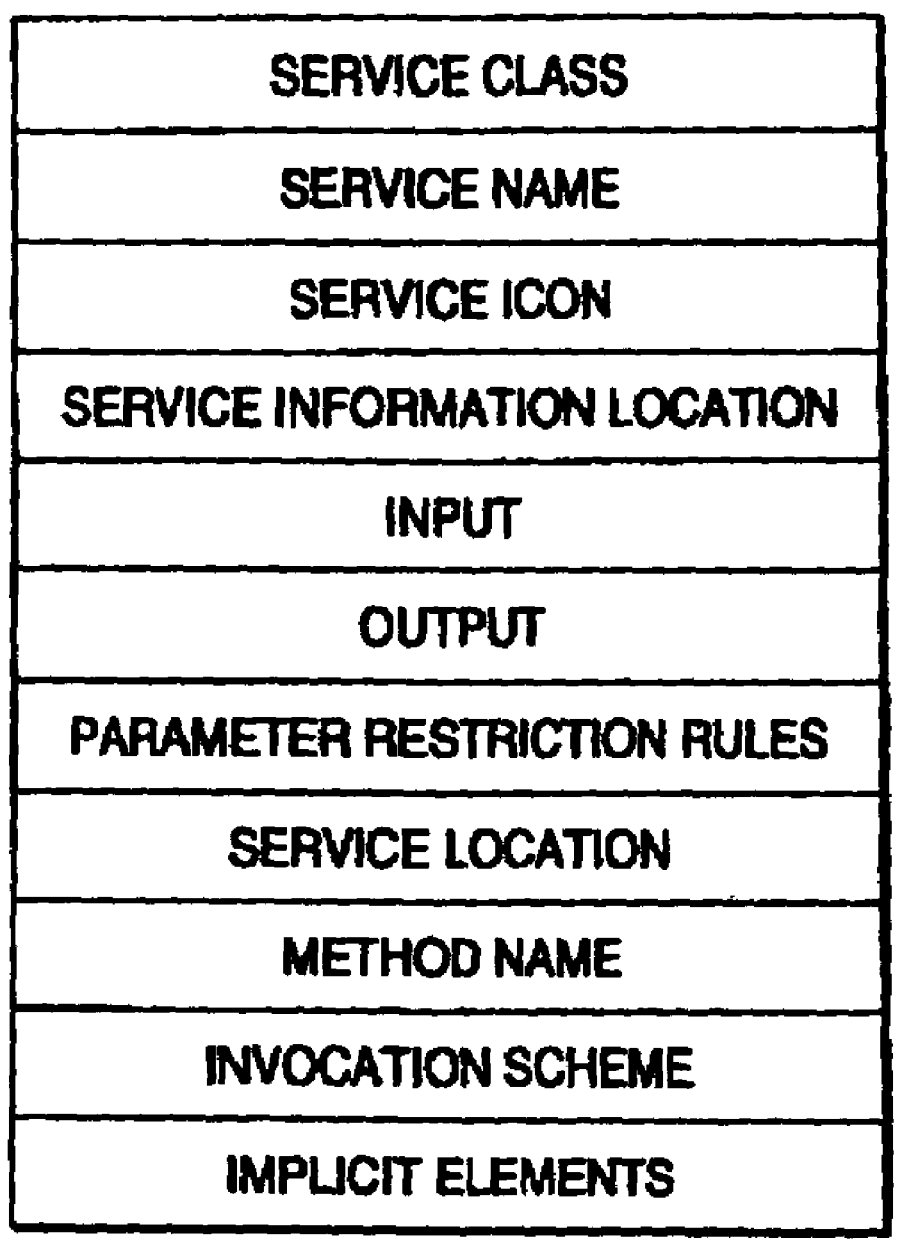
FIG. 3 shows the structure of I/F information stored in each apparatus.

FIG. 3 shows the structure of the I/F information. The I/F information is formed by <service class>, <service name>, <service icon>, <service information location>, <input>, <output>, <parameter restriction rules>, <service location>, <method name>, <invocation scheme>, and <implicit elements>.

<Service class> is a class (indicating the contents of a process) of a service provided by a service processing apparatus. <Service class> is a predefined service class and is scanning printing, a repository, a flow, or the like. <Service name> is a name of the service provided by the service processing apparatus. <Service icon> is position information of an icon to be displayed on a GUI of the client terminal 10.

<Service information location> is a URL to be used for the instruction data generation server 30 to acquire I/F information. <Input> is an input to the service. <Output> is an output of the service. <Parameter restriction rules> is restriction rules that are applied to <input>. <Service location> is position information to be used when the service is performed actually. <Method name> is a name indicating a method for providing a service process or the service itself.

<Invocation scheme> is a method for calling and invoking a service process, and may be SOAP (simple object access protocol), SMTP (simple mail transfer protocol), or the like (SOAP and SMTP are message exchange protocols). <Implicit elements> is data that is not passed explicitly as an output to but can be referred to by a downstream processing step.

To make an instruction to generate instruction data or to select instruction data to be activated, the client terminal 10 has a graphical user interface (GUI) function for displaying a screen and allowing prescribed manipulations.

The service search server 20 searches the plural services connected to the network 5 for a service that satisfies search conditions. The service search server 20 contains, in advance, part of the I/F information (hereinafter referred to as "partial I/F information") of each of the various service processing apparatus such as the image processing apparatus 61, the document management server 62, the document delivering server 63, the first service processing apparatus 64, and the second service processing apparatus 65. The term "partial I/F information" unit, among the elements of the I/F information, <service class>, <service name>, service information location>, <input>, and <output>.

When receiving search conditions from the instruction data generation server 30 or the cooperative processing server 50, the service search server 20 searches for a service using the partial I/F information of each service processing apparatus. For example, to search for a service that is similar to a prescribed one, the service search server 20 searches for a service in which coincidence is found in <service class>, a service in which coincidence is found in <input> and <output>, or a service in which coincidence is found in all of those elements.

The instruction data generation server 30 acquires the I/F information from each of service processing apparatus and generates instruction data for causing the service processing apparatus to cooperate with each other. More specifically, to generate instruction data the instruction data generation server 30 executes the following process.

On the basis of <service information location>, the instruction data generation server 30 requests each of prescribed service processing apparatus distributed via the network 5 to send the I/F information of its service. If part of the prescribed service processing apparatus do not exist, the instruction data generation server 30 instructs the service search server 20 to search for other service processing apparatus capable of performing the same services as the part of the prescribed service processing a s are to perform. The instruction data generation server 30 may acquire <service information location> of other service processing apparatus from the service search server 20.

The instruction data generation server 30 manages search results received from the service search server 20 and the I/F information received from each service processing apparatus. On the basis of the I/F information acquired from each service processing apparatus, the instruction data generation server 30 generates an HTML file for a GUI screen to be used for defining a job flow (i.e., a cooperative process). When receiving a service browsing request form the client terminal 10, the instruction data generation server 30 sends the HTML file for the GUI screen to the client terminal 10.

Figure 4:
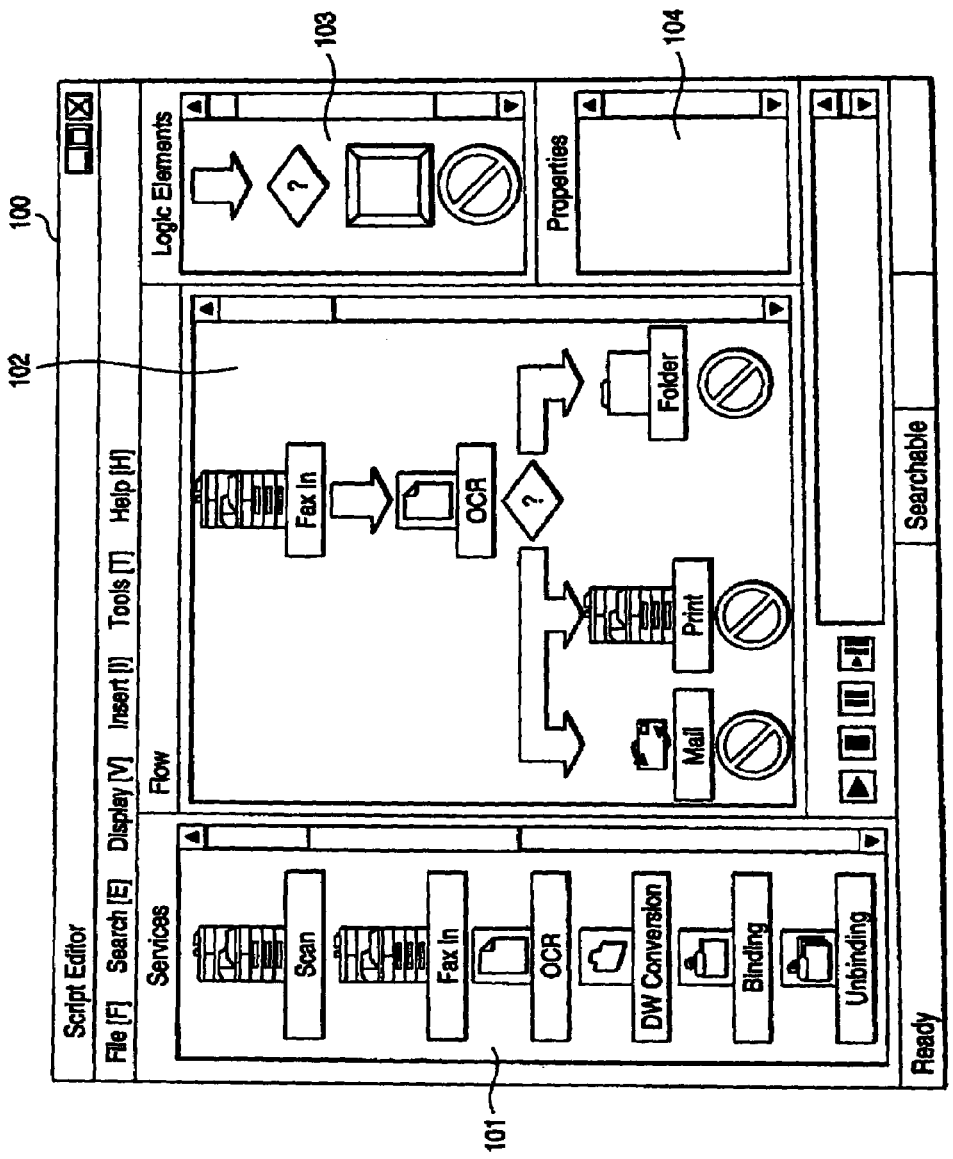
FIG. 4 shows an instruction data editor screen being displayed on a GUI of an instruction data editor.

FIG. 4 shows an instruction data generation screen 100 that is a GUI screen to be used for defining a job flow. The instruction data generation screen 100 is formed by a service window 101, a flow window 102, a logic window 103, and a property window 104.

The service window 101 displays various usable service processing apparatus. The logic window 103 displays job flow elements to be used for indicating a pattern of cooperation between services. The property window 104 displays detailed setting parameters of each icon being displayed in the service window 101 and the logic window 103.

A user can define a job flow in the flow window 102 by drag-and-dropping icons in the service window 101 and icons in the logic window 103. Further, the use can set, in a detailed manner, relationships between services and logic elements by editing the displayed contents of the property window 104.

In the flow window 102 shown in FIG. 4, an exemplary job flow is defined that is to generate text data of facsimile-received (indicated by "fax in" in FIG. 4) document by OCR-processing it (indicated as "OCR" in FIG. 4) and then perform mail transmission (indicated as "mail" in FIG. 4), printing (indicated as "print" in FIG. 4), and folder storage processing (indicated by "folder in FIG. 4) on the received document.

When it is desired to carry out plural parallel-executable jobs in parallel (i.e., simultaneously), a job flow can be defined so. In the example of FIG. 4, since the mail transmission process, the printing process, and the folder storage process are parallel-executable, a job flow can be defined so that they will be executed in parallel by drag-and-dropping their icons into the flow window 102 so that they are arranged in parallel. In this manner, a complex process as a mixture of serial processes and parallel processes can be defined easily. The instruction data generation server 30 may be configured so as to be able to specify, icon by icon, whether to set parallel processing.

As described above, a user can easily form instruction data for a complex cooperative process including a variety of processes by defining a job flow by drag-and-dropping icons in the service window 101 and icons in the logic window 103 into the flow window 102 and editing the contents of items displayed in the property window 104.

The client terminal 10 sends information of a job flow that has been defined by manipulations of a user and is in CGI (common gateway interface) format to the instruction data generation server 30.

On the basis of job flow infusion relating to a use's instructions for service cooperation and the I/F information of each service, the instruction data generation server 30 generates instruction data that defines the contents of a process that each service processing apparatus will be requested to execute, input parameters, a manner of cooperation between services (i.e., a job flow), and information for identifying a document as a subject of processing such as a document name and storage location information. Instruction data is an XML file.

FIG. 5 is a conceptual diagram of instruction data in XML format. A cooperative process of plural services is also regarded as one service. Therefore, this instruction data is such that <flow> is added to the I/F information shown in FIG. 3.

<Flow> is an element that describes cooperation between services and includes <invoke>, elements such as <if> indicating a control structure, logical operations, and condition judgments, XML-structure manipulation instructions for adjustment of the cooperation between services, and information for identifying a document as a subject of processing.

<Invoke> indicates a particular method of a service processing apparatus and serves to call a service. <Invoke> has, as elements, <map> that indicates position information of parameters and <method> that is a method name for a call. <If>, <and>, <eq>, and <gt>, which indicate a control store, logical operations, etc., serve to perform conditional branching during execution of a cooperative process and to adjust parameters that are exchanged between services.

FIG. 9 outlines part of the <flow> portion of exemplary instruction data FIG. 9 shows just an example and the invention is not limited to it.

Figure 10:
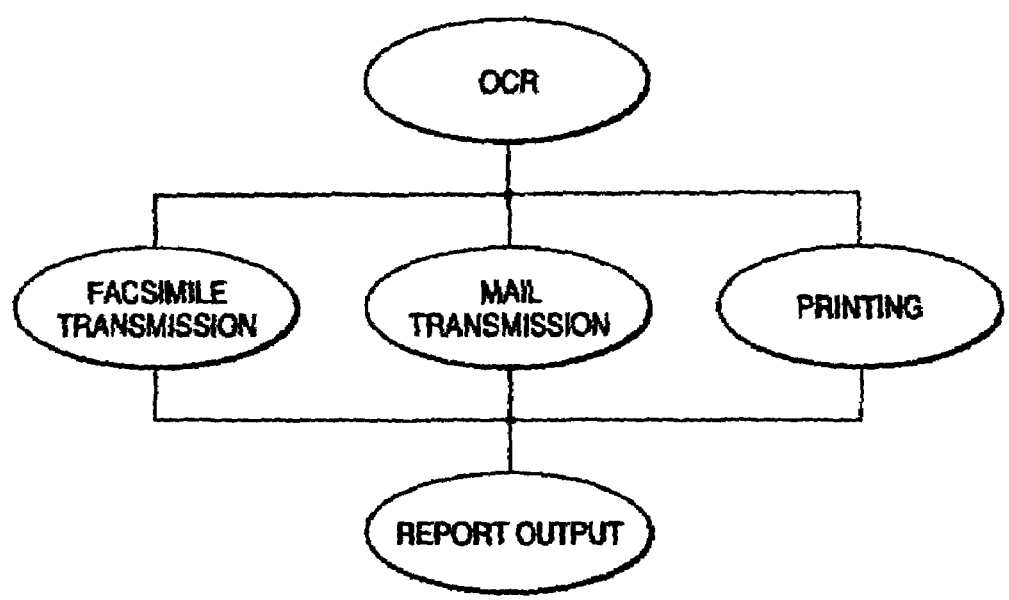
FIG. 10 shows an exemplary job flow including parallel processes.

The example of FIG. 9 corresponds to instruction data of a job flow shown in FIG. 10, which is to perform OCR (optical character recognition) processing on a prescribed document, then perform, in parallel, facsimile transmission, mail transmission, and printing, and finally output, as a report, processing results of the above respective processes.

As shown in FIG. 9, the contents of the OCR process are defined by parameters (eg., a reading resolution) etc. that are written between a start tag  and an end tag  indicating the OCR process.

Similarly, the content of the facsimile transmission process are defined by parameters (e.g., a transmission destination facsimile number) etc. that are written between a start tag <faxsnd> and an end tag </faxsnd> indicating the facsimile transmission process.

The contents of the mail transmission process are defined by parameters (e.g., a transmission destination mail number) etc. that are written between a start tag <a mailsnd> and an end tag </mailsnd> indicating the mail transmission process.

The contents of the printing process are defined by parameters (e g, an output resolution) etc. that are written between a start tag <prinr> and an end tag </print> indicating the printing process.

The contents of the report output process are defined by parameters (e.g., an output format) etc. that are written between a start tag <report> and an end tag </report> indicating the report output process.

Jobs that should be carried out in parallel are sandwiched between a start tag <para> and an end tag </para>. Therefore, in the example of FIG. 9, the facsimile transmission process, the mail transmission process, and the printing process are executed in parallel.

In instruction data, all information relating to a control on a cooperative process of services is described in the elements of <fow>. Therefore, a cooperative process that is represented by instruction data is also regarded as one service. The structure of instruction data is not limited to the one shown in FIG. 5 and may be in any form as long as it enables cooperation between services.

The instruction data generation server 30 sends XML transmission data as described above to the instruction data management server 40. If execution of a service cooperative process has been ordered by a user, the instruction data generation server 30 may directly send instruction data to the cooperative processing server 50.

The instruction data management server 40 holds instruction data that have been sent from the instruction data generation server 30, and sends instruction data to the cooperative processing server 50 in response to a request from the client terminal 10. Storing and holding generated instruction data in this manner make it possible to call and execute instruction data when necessary. Therefore, it is not necessary to generate instruction data each time, which unit efficient document processing.

The cooperative processing server 50 is a server for interpreting and executing designated instruction data. Upon receiving instruction data, the cooperative processing server 50 interprets it and executes a cooperative process by calling, in order, service processing apparatus such as the image processing apparatus 61, the document management server 62, and the document delivering server 63 according to order and methods of use that are described in the instruction data. The cooperative processing server 50 stores such information as a status of a cooperative process being executed and results of finished cooperative process, and communicates a status or a result of a cooperative process in response to an external request.

In interpreting instruction data and requesting each service processing apparatus to perform its service, the cooperative processing server 50 generates individual instruction information including the contents of a processing request, input parameters, and information for identifying a document as a subject of processing. The cooperative processing server 50 may extract information indicating relationships between a service process to be executed by each service processing apparatus and service processes to be executed before and after the former in a cooperative process and describe those relationships in instruction data. Or the cooperative processing server 50 may request each service processing apparatus to execute its service process in an information exchange form that is specific to the later rather than uses instruction data.

The image processing apparatus 61 is a computer in which a software program for an image processsing function is installed. The image processing apparatus 61 processes a document on the basis of the contents of a service process request, input parameters, and information of a document as a subject of processing that are included in a process request sent from the cooperative process server 50. The image processing apparatus 61 communicates partial I/F information to the service search server 20 at the time of starting. Further, the image processing apparatus 61 sends I/F information indicating a method for using its image processing service to the instruction data generation server 30 in response to a request from it. This I/F information is used in generating instruction data.

The document management server 62 has a document storage function. On the basis of information included in a request from the cooperative processing server 50, the document management server 62 stores, searches for, or reads a document, changes an attribute of a document, or performs one of other various kinds of processing. The document management server 62 communicates partial I/F information to the service search server 20 at the time of starting. Further, the document management server 62 sends I/F information indicating a method for using its document management service to the instruction data generation server 30 in request to a request from it.

The document delivering server 63 has functions of storing an acquired document in a specified document management server, sending a mail or a facsimile message to a specified transmission destination, and causing a specified printer to perform a print output process. The document delivering server 63 executes a document delivery process on the basis of a document that has been specified by the client terminal 10 and information of its delivery destination in response to a request from the cooperative processing server 50. The document delivering server 63 communicates partial I/F information to the service search server 20 at the time of starting. Further, the document delivering server 63 sends I/F information indicating a method for using its document delivery service to the instruction data generation server 30 in response to a request from it.

The first service processing apparatus 64 is an apparatus for executing a prescribed service process relating to a document according to an external instruction. The first service processing apparatus 64 executes a service process that should be executed by itself on the basis of such information as the contents of a processing request from the cooperative processing server 50, input parameters, and information for identifying a document as a subject of processing. The first service processing apparatus 64 communicates partial I/F information to the service search server 20 at the time of starting. Further, the first service processing apparatus 64 sends I/F information indicating a method for using its service process to the instruction data generation server 30 in response to a request from it. The second service processing apparatus 65 operates in the same manner as the first service processing apparatus 64 does except for the contents of the service process.

In the document processing system 1 having the above configuration, the service processing apparatus such as the image processing apparatus 61, the document management server 62, and the document delivering server 63 operates as described below when application programs for execution of the respective prescribed service processes are installed therein.

In a starting process, each of the service processing apparatus such as the image processing apparatus 61, the document management server 63, and the document delivering server 63 communicates partial I/F information including its address and information indicating an outline of its service to the service search server 20.

The service search server 20 stores the pieces of partial I/F information that are sent from the service processing apparatus such as the image processing apparatus 61, the document management server 62, and the document delivering server 63. This allows the service search server 20 to do a search using the partial I/F information when receiving a prescribed service search request from the instruction data generation server 30 or the cooperative processing server 50, for example.

The client terminal 10 corresponds to setting unit of the invention. The cooperative processing server 50 corresponds to interpreting unit, cooperative processing unit, and rewriting unit of the invention. The instruction data generation server 30 corresponds to generating unit of the invention. The instruction data management server 40 corresponding to storing unit of the invention.

[Generation of Instruction Data]

Figure 6:
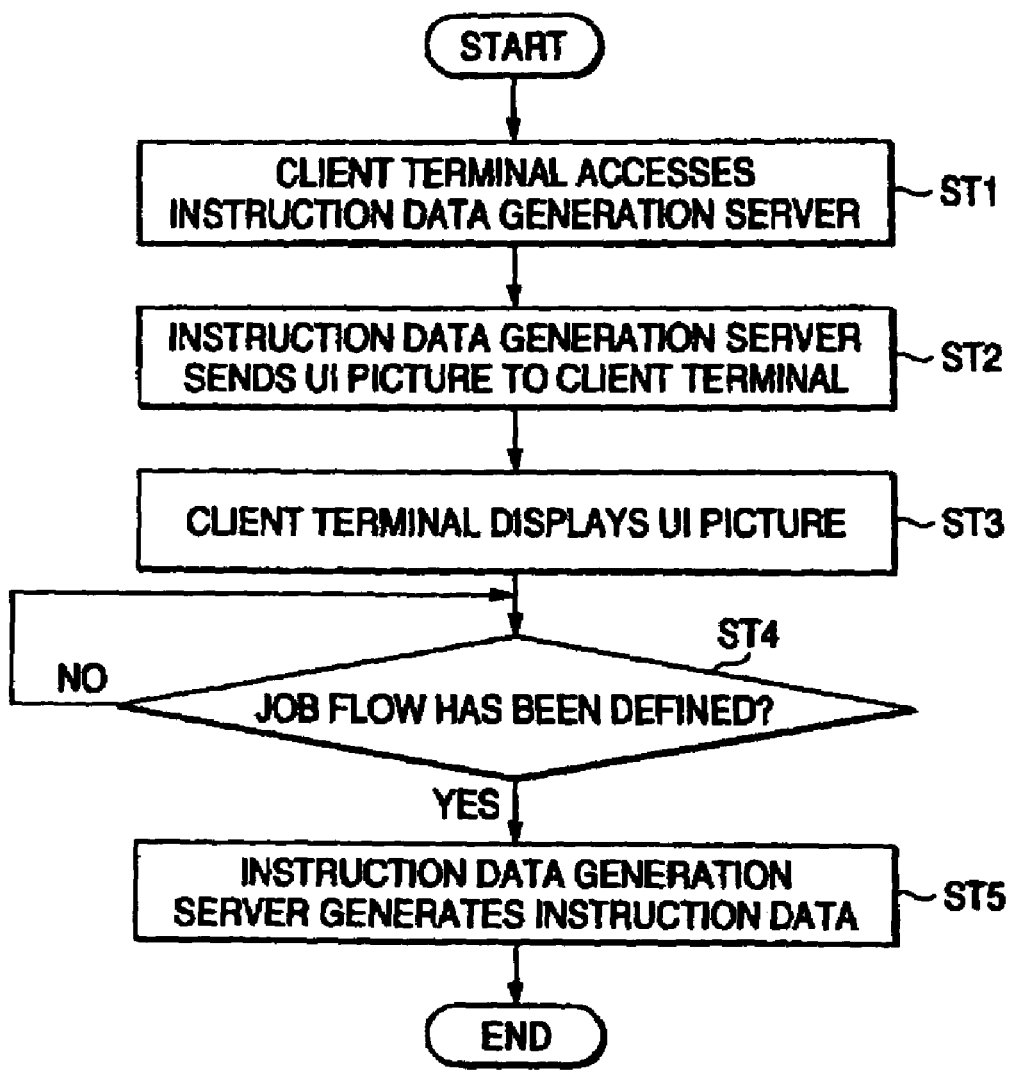
FIG. 6 is a flowchart of an instruction data generation process.

FIG. 6 is a flowchart of a process that is executed by the client terminal 10 and the instruction data generation server 30 in generating instruction data.

At step ST1, the client terminal 10 accesses, through a browser installed therein, according to a manipulation of a use, the instruction data generation server 30 at a URL (uniform resource locator) of an HTML file generated for a user interface screen to be provided by the instruction data generation server 30.

In response to a browsing request from the client terminal 10, at step ST2 the instruction data generation server 30 sends the HTML file of the user interface screen to the client terminal 10.

At step ST3, the client terminal 10 displays the user interface screen on the basis of screen forming information that is included in the HTML file sent from the instruction data generation server 30. A user can define a job flow of desired service cooperation using the user interface screen being displayed on the client terminal 10.

At step ST4, the client terminal 10 judges whether a job flow has been defined through the user interface screen. If not, the client terminal 10 waits until a job flow is defined. If judging that a job flow has been defined, the client terminal 10 sends, to the instruction data generation server 30, job flow information that relates to service cooperation that has been defined by the user.

At step ST5, the instruction data generation server 30 generates instruction data that defines the contents of a process that each service processing apparatus will be requested to execute, input parameters, a manner of cooperation between services, and information for identify a document as a subject of processing such as a document name and storage location information on the basis of the information relating to the job flow of the service cooperation that has been sent from the client terminal 10 and I/F information acquired from each service processing apparatus. The instruction data generation server 30 sends XML instruction data to the instruction data management server 40.

The instruction data management server 40 stores the instruction data that has been generated by the instruction data generation server 30. Containing plural instruction data that were generated by the instruction data generation server 30, the instruction data management server 40 reads out selected instruction data when receiving an instruction data selection instruction from the client terminal 10.

[Activation and Execution of Cooperative Process]

A user can activate a cooperative process by selecting desired instruction data from the plural instruction data stored in the instruction data management server 40. The details will be described below.

Figure 7:
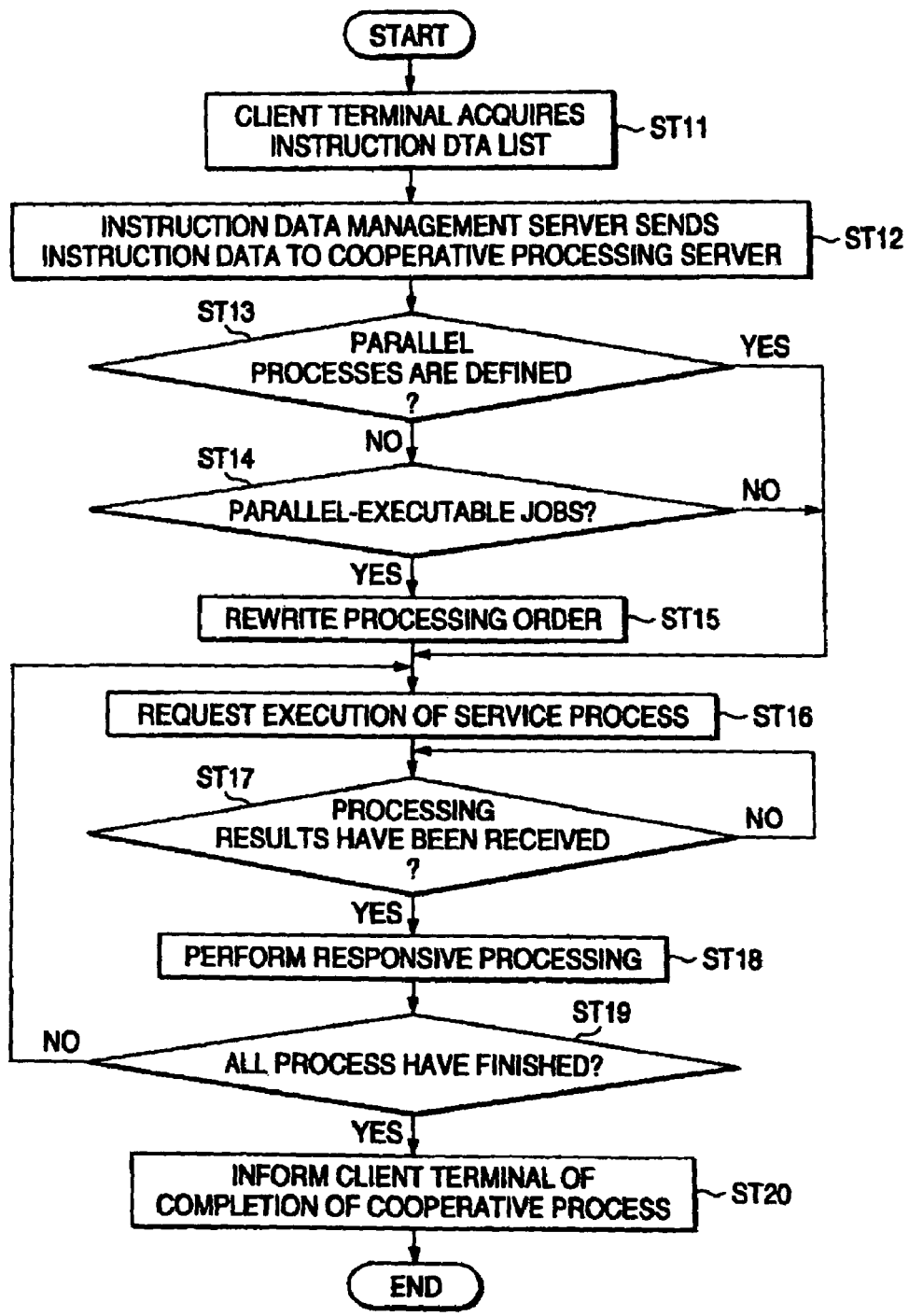
FIG. 7 is a flowchart of a cooperative process that is executed by the document processing system.

FIG. 7 is a flowchart of a process that is executed by the client terminal 10 and the cooperative processing server 50. As shown in the job flow of FIG. 9, this process is to perform OCR (optical character recognition) processing on a prescribed document, then perform facsimile transmission of a resulting image document to a location having a specified facsimile number, its printing, and mail transmission of an extracted text document to a specified mail address, and finally output, as a report, processing results of the above respective processes. It is assumed that the document delivering server 63 is in charge of the facsimile transmission process, the first service processing apparatus 64 is in charge of the mail transmission process, and the second processing apparatus 65 is in charge of the printing process.

At step ST11, the client terminal 10 accesses the instruction data management server 40 and acquires an instruction data list that is managed by the instruction data management server 40.

Figure 8:
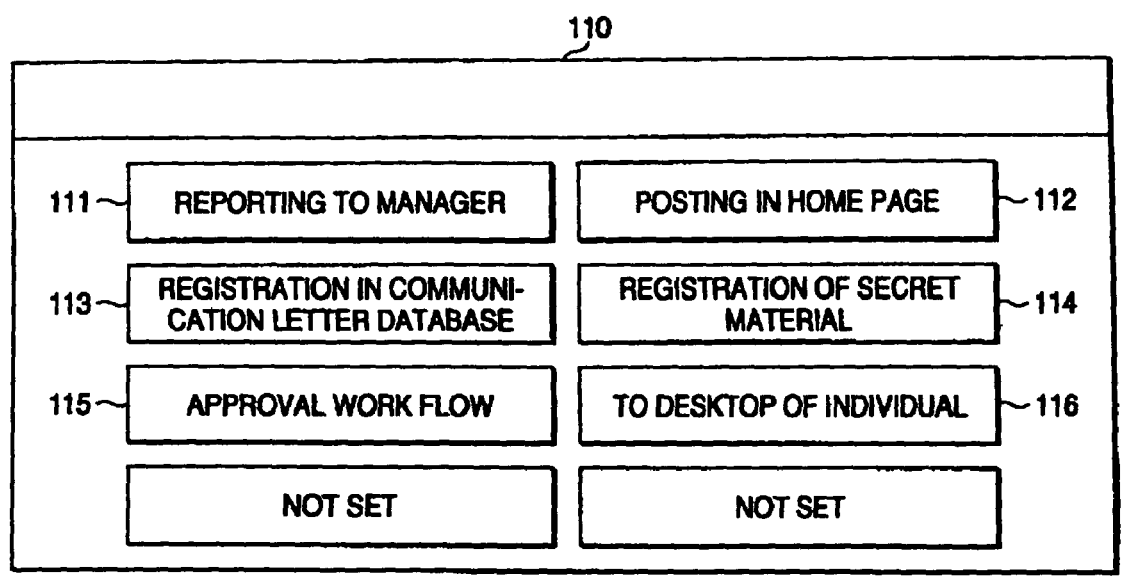
FIG. 8 shows an exemplary instruction data list screen.

FIG. 8 shows an exemplary service cooperative process selection screen 110 that represents an instruction data list. The service cooperative selection screen 110 has instruction data selection buttons 111-116 for respective instruction data. A user can select instruction data by clicking on a desired button in the service cooperative process selection screen 110.

The client terminal 10 selects instruction data corresponding to a desired service cooperative process on the basis of a manipulation instruction of a user for selecting it and activates that instruction data At this time, if necessary, the client terminal 10 displays a parameter input screen and causes the user to input parameters necessary for execution of a job.

At step ST12, the instruction data management server 40 sends the cooperative processing server 50 the instruction data that has been selected by the client terminal 10. In response, the cooperative processing server 50 starts execution of the cooperative process.

At step ST13, the cooperative processing server 50 interprets the instruction data sent from the instruction data management server 40 and judges whether jobs that should be carried out in parallel are defined there. This is done by judging whether the instruction data includes a tag <para> that indicates parallel processing.

If parallel processes are not defined in the instruction data, the process goes to step ST14. If parallel processes are defined, the process goes to step ST16.

At step ST14, it is judged whether the jobs whose execution has been ordered by the instruction data include plural parallel-executable ones. For example, this can be done by storing, in advance, a list of parallel-executable jobs in a memory of the cooperative processing server 50 and judging whether the stored list of parallel-executable jobs include plural jobs that coincide with jobs described in instruction data.

If plural parallel-executable jobs exist, the process goes to step ST15. If not, the process goes to step ST16.

Figure 11:
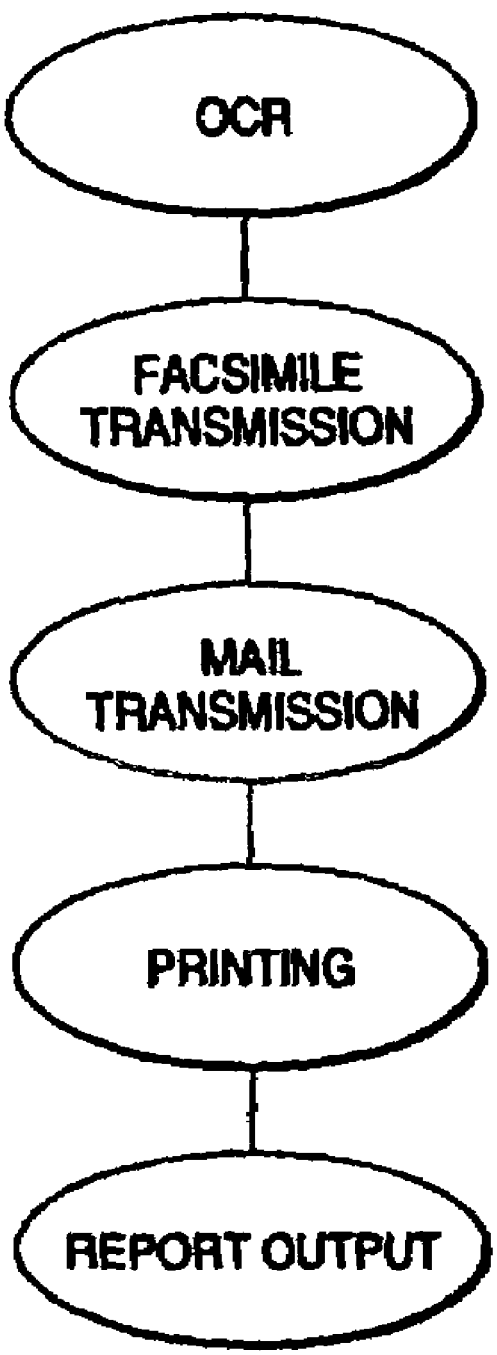
FIG. 11 shows an exemplary job flow that consists of only serial processes.

At step ST15, the instruction data is rewritten so that the plural parallel-executable jobs that are originally described so as to be carried out serially will be carried out in parallel. For example, if the instruction data defines a job flow in which all the jobs should be carried out serially as shown in FIG. 11, for example, the <flow> portion of the instruction data should include statements in which tags indicating execution of the respective jobs are arranged in order as shown in FIG. 12, for example.

In this case, since the facsimile transmission process, the mail transmission process and the printing process can be executed in parallel, the instruction data is rewritten so that, as shown in FIG. 9, the start tag <faxsnd> and the end tag </faxsnd> indicating the facsimile transmission process, the start tag <mailsnd> and the end tag </mailsnd> indicating the mail transmission process, and the start tag <print> and the end tag </pint> indicating the printing process that are shown in FIG. 12 are sandwiched between a start tag <para> and an end tag </para> indicating that parallel processing should be performed should be performed. As a result, the job flow of FIG. 11 that consists of only the serial processes is converted into a job flow of FIG. 10 in which serial processes and parallel processes exist in mixture.

Then, at step ST16, the cooperative processing server 50 starts to interpret the instruction data in order and requests the image processing apparatus 61 to execute the OCR process which is the first process described in the instruction data. More specifically, the cooperative processing server 50 generates individual instruction information by extracting a location of a service processing apparatus to be requested to execute the process, formats of input parameters and output parameters that are necessary to request execution of the process, a method name for requesting execution of the process, an invocation method, and information for identifying a document as a subject of processing on the basis of the information contained in the instruction data such as the parameters etc. written between the start tag  and the end tag  shown in FIG. 9. The cooperative processing server 50 sends the generated individual instruction information to the image processing apparatus 61 as the first processing request destination.

Figure 13:
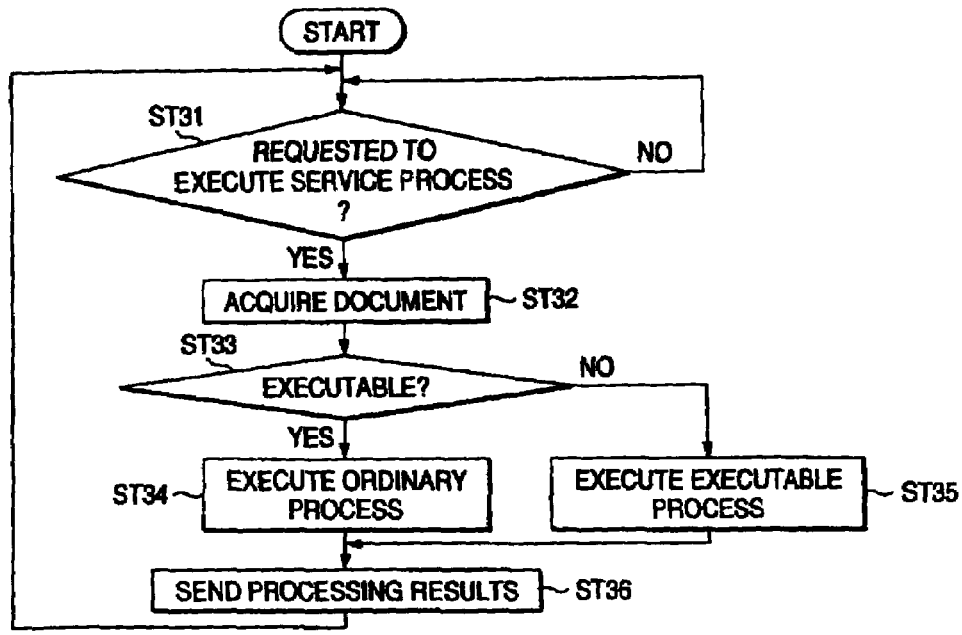
FIG. 13 is a flowchart of a control routine of each apparatus.

FIG. 13 is a schematic flowchart of a control routine that is executed by each apparatus such as the image processing apparatus 61.

At step ST31, the image processing apparatus 61 judges whether it has been requested to execute a process. If requested to execute a process, at step ST32 the image processing apparatus 61 acquires a document by coping a document as a subject of processing on the basis of storage location information of the processing subject document that is written in the received instruction data. At step ST33, the image processing apparatus 61 interprets the contents of the requested service process and judges whether the requested service process can be executed on the acquired image document. For example, the image processing apparatus 61 judges whether the requested service process can be executed with specified parameters, whether another job is being carried out, and so forth. If the requested service process is executable, at step S134 the image processing apparatus 61 performs ordinary OCR processing with the specified parameters, binds an image document produced by the image processing with an extracted text document, and re-stores a resulting bound document in the original storage location.

After completion of the above process, at step ST36 the image processing apparatus 61 sends processing results such as status information ("completion") of the process, output parameters, and processed document storage destination information to the cooperative processing server 50.

On the other hand, if it is judged at step ST33 that the requested service process is not executable, a predetermined executable process is executed at step ST35. For example, if it is judged that the requested service process cannot be executed with specified parameters, OCR processing is performed with predetermined, executable parameters. In this case, processing results to be sent to the cooperative, processing server 50 are formed so as to include information to the effect that the process was executed with the predetermined parameters rather than the specified ones. If it is judged that another job is being carried out, the image processing apparatus 61 waits until its execution is completed and executes the ordinary process upon completion of its execution. In this case, the image processing apparatus 61 may inform the cooperative processing server 50 that the image processing apparatus 61 is in a standby state.

As described above, the process-execution-requested apparatus judges whether the requested process is executable and executes a predetermined executable process if the requested process is not executable.

Then, at step ST17 (see FIG. 7), the cooperative processing server 50 judges whether processing results have been received. If processing results have been received from the image processing apparatus 61, at step ST18 the cooperative processing server 50 performs responsive processing of managing (i.e., storing) the first processing results in the form of a log.

At step ST19, the cooperative processing server 50 judges whether all the processes have finished, that is, whether a job to be carried out next is written in the instruction data. If there exists a job to be carried out next, at step ST16 the cooperative processing server 50 requests as in the case that it requested the execution of the first process, an apparatus concerned to execute the second process.

As shown in FIG. 9, in the instruction data. the tags of the facsimile transmission process, the mail transmission process, and the printing process are written between the start tag <para> and the end tag </para> for defining the parallel processes after the tags indicating the execution of the OCR process.

Therefore, the cooperative processing server 50 causes those processes to be executed in parallel. Specifically, as in the case that it requested the execution of the first process, the cooperative processing server 50 generates, for each of the parallel processes, individual instruction information by extracting a location of a service processing apparatus to be requested to execute the process, formats of input parameters and output parameters that are necessary to request execution of the process, a method name for requesting execution of the process, an invocation method, and information for identifying a document as a subject of processing on the basis of the parameters etc. written between the start tag and the end tag.

The cooperative processing server 50 sends individual instruction information for the facsimile transmission process to the document delivering server 63, individual instruction information for the mail transmission process to the first service processing apparatus 64, and individual instruction information for the printing process to the second service processing apparatus 65. That is, for the jobs to be carried out in parallel, processing requests are sent simultaneously instead of a procedure that a next processing request is sent after reception of processing results.

On the basis of the contents of the requests from the cooperative processing server 50, the document delivering server 63 faxes a specified document to a location having a specified facsimile number, the fist service processing apparatus 64 mails a specified document to a specified mail address, and the second service processing apparatus 65 prints out a specified document.

In doing so, at step ST33 (see FIG. 13), each apparatus judges whether the requested process is executable. If the requested process cannot be executed in the requested manner, each apparatus executes a predetermined executable process at step ST35. For example, if the other party is busy in the facsimile transmission process, the document delivering server 63 executes, a prescribed number of times (in the maximum case), a retry process (i.e., predetermined executable process) of sending a facsimile message after waiting for a prescribed time. If connection to the other party is not established even by executing the above process, the document delivering server 63 sends the cooperative processing server 50 a processing result to the effect that facsimile transmission failed though it was tried the prescribed number of times. Step ST33 corresponds to judging unit of the invention and step ST35 corresponds to processing unit of the invention.

As described above, a proms-execution-requested apparatus judges whether a requested process is executable and executes a predetermined executable process if the requested process is not executable. An alternative procedure is as follows. The cooperative processing server 50 acquires the status of each apparatus and judges whether each apparatus can execute its requested process. If judging that a certain apparatus cannot execute the requested process, the cooperative processing server 50 instructs that apparatus to execute a predetermined executable process.

At step ST17, the cooperative processing server 50 judges whether processing results of all the parallel processes have been received. If processing results of all the parallel processes have been received, at step ST18 the cooperative processing server 50 performs responsive processing of storing the processing results in the form of a log as in the case that the first processing results were done.

If execution of the report output process as the last process has been requested and processing results have been received in the same manner as described above, that is, if all the processes have finished, the process goes to step ST20. That is, if it is judged that the instruction data does not include a next process, the process goes to step ST20. In requesting execution of the report output process, the cooperative processing server 50 sends, for example individual instruction information including all the received processing results etc. to the second service processing apparatus 65. In response, the second service processing apparatus 65 prints out the processing results of the executed processes collectively.

At step ST20. the combative processing server 50 sends the client server 10 a notice to the effect that all the processes have finished. The cooperative process is then finished.

As described above, plural service processes are executed on a document in a cooperative manner by respective processing apparatus connected to the network 5 according to instruction data including information indicating how the cooperative processes should cooperate with each other, information relating to a storage location of the document, and other information. This makes it possible to efficiently execute a complex cooperative process including a variety of processes.

Since a control is made so that parallel-executable processes can be executed simultaneously, plural service processes can be executed efficiently.

The above-described sections such as the servers that are connected to the network 5 may be independent apparatus or part or all of those sections may be incorporated in a single apparatus.

Figure 14:
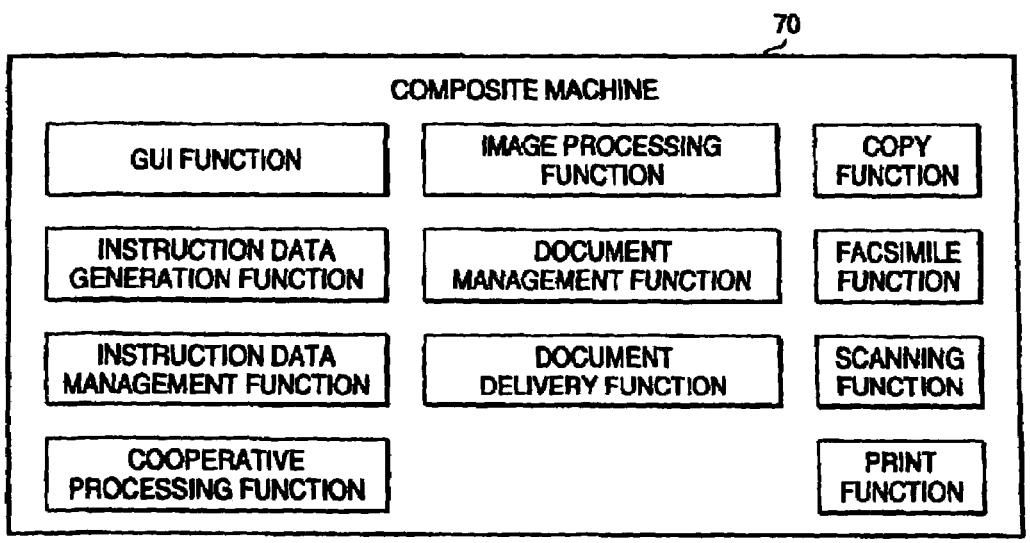
FIG. 14 is a functional block diagram of a composite machine.

For example, as shown in FIG. 14, the GUI function of the client terminal 10 for allowing various kinds of manipulations for generation of instruction data, selection of instruction data, etc, the instruction data generation function of the instruction data generation server 30, the instruction data management function of the instruction data management server 40, the cooperative processing function of the cooperative processing server 50, the image processing function of the image processing apparatus 61, the document management function of the document management server 62, and the document delivery function of the document delivering server 63 may be incorporated in a composite machine 70 having a copy function, a facsimile function, a scanning function, a print function etc. as functions for executing service processes.

In this case, not only can instruction data be generated and stored in the composite machine 70 but also image processing such as noise elimination and OCR processing, processed document data storage, facsimile transmission, mail transmission, etc. can be perform in a cooperative manner on document data stored in the composite machine 70. Naturally, instruction data can, for example, be generated or selected by the client terminal 10 as in the case of the above embodiment.

Document data as a subject of processing and instruction data may be stored in an external apparatus that is connected to the network 5. Document data stored in the composite machine 70 or an external apparatus may be processed by, rather than the composite machine 70, another composite machine that is connected to the network 5 or external apparatus that are connected to the network 5 and have respective processing functions.

Although in the above embodiment the service search server 20 acquires part of I/F information (i.e., partial I/F information) from each service processing apparatus, it may acquire the entire I/F information.

As described above, the invention provides advantages that it becomes possible to set the processing order of plural processes to be executed on document data so that they will be executed serially and/or in parallel and to cause plural apparatus connected to a network to execute plural processes in cooperation.

The entire disclosure of Japanese Patent Application No. 2003-079267 filed on Mar. 24, 2003 including specification, claims, drawings and abstract is incorporated herein by reference in its entirety.

What is claimed is:

1. A service processing apparatus comprising:
    a setting unit that sets at least a location of document data and a content of a plurality of service processes to be executed on the document data, and sets a processing order of the plurality of service processes, the plurality of services processes being executed serially, executed in parallel, or executed both serially and in parallel, on the basis of the processing order set by the setting unit;
    a generating unit that generates, on the basis of settings made by the setting unit, instruction data instructing to execute the plurality of service processes on the document data in the processing order set by the setting unit, the settings including the location, the content of a plurality of service processes, and the processing order;
    an interpreting unit that determines whether the instruction data includes instruction which instructs to execute a plurality of parallel-executable processes in serial;
    a rewriting unit that rewrites the instruction data to instruct to execute the plurality of parallel-executable processes in parallel under the condition that the interpreting unit determines that the instruction data includes instruction which instructs to execute the plurality of parallel-executable processes in serial, and
    a cooperative processing unit that controls, on the basis of the rewritten instruction data, a plurality of service processing apparatuses connected to a network to execute the plurality of service processes on the document data in parallel.

2. The service processing apparatus according to clam 1, further comprising:
    a judging unit that judges whether each of the plurality of service processes is executable; and
    a processing unit that makes, if a service process is judged unexecutable by the judging unit, a service processing apparatus in charge of the unexecutable service process execute a predetermined executable service process.

3. A service processing method performed by a processing apparatus, the method comprising:
    at least one or more processors to implement the following steps:
    setting at least a location of document data and a content of a plurality of service processes to be executed on the document data, and setting a processing order of the plurality of service processes, the plurality of service processes being executed serially, executed in parallel, or executed both serially and in parallel, on the basis of the processing order;

generating, on the basis of settings made in the setting step, instruction data instructing to execute the plurality of service processes on the document data in the processing order set in the setting step, the settings including the location, the content of a plurality of service processes, and the processing order;

determining whether the instruction data includes instruction which instructs to execute a plurality of parallel-executable processes in serial;

rewriting the instruction data to instruct to execute the plurality of parallel- executable processes in parallel under the condition that the instruction data is determined to include instruction which instructs to execute a plurality of parallel-executable processes in serial; and controlling, on the basis of the rewritten instruction data, a plurality of service processing apparatuses connected to a network execute the plurality of service processes on the document data in a cooperative manner.

4. The service processing method according to claim 3, further comprising:

judging whether each of the plurality of service processes is executable; and making, if a service process is judged unexecutable, a service processing apparatus in charge of the unexecutable service process execute a predetermined executable service process.

5. A service processing apparatus comprising:

a setting unit that sets at least a location of document data and a content of a plurality of service processes to be executed on the document data, and sets a processing order of the plurality of service processes, the plurality of service processes being executed serially, executed in parallel, or executed both serially and in parallel, on the basis of the processing order set by the setting unit;

a generating unit that generates, on the basis of settings made by the setting unit, instruction data instructing to execute the plurality of service processes on the document data in the processing order set by the setting unit, the settings including the location, the content of the plurality of service processes, and the processing order;

an interpreting unit that determines whether the instruction data includes instruction which instructs to execute a plurality of parallel-executable processes in serial;

a rewriting unit that rewrites the instruction data to instruct to execute the plurality of parallel-executable processes in parallel under the condition that the interpreting unit determines that instruction data includes instruction which instructs to execute a plurality of parallel- executable processes in serial; and a process executing unit that executes a service process on the document data on the basis of the rewritten instruction data; and a sending unit that sends the rewritten instruction data to a service processing apparatus for executing a next service process after the process executing unit has finished execution of the service process.

6. The service processing apparatus according to claim 5, further comprising:

a judging unit that judges whether the service process is executable; and a processing unit that executes a predetermined executable service process if the service process is judged unexecutable by the judging unit.

7. A service processing method comprising:

at least one or more processors to implement the following steps:

setting at least a location of document data and a content of a plurality of service processes to be executed on the document data, and setting a processing order of the plurality of service processes, the plurality of service processes being executed serially, executed in parallel, or executed both serially and in parallel, on the basis of the processing order;

generating, on the basis of settings made in the setting step, instruction data instructing to execute the plurality of service processes on the document data in the processing order set in the setting step, the setting including the location, the content of a plurality of service processes, and the processing order;

determining whether the instruction data includes instruction which instructs to execute a plurality of parallel-executable processes in serial;

rewriting the instruction data to instruct to execute the plurality of parallel-executable processes in parallel under the condition that the instruction data is determined to include instruction which instructs to execute a plurality of parallel-executable processes in serial;

executing a service process on the document data on the basis of the rewritten instruction data; and sending the rewritten instruction data to a service processing apparatus for executing a next service process after the process executing step has finished execution of the service process.

8. The services processing apparatus according to claim 1, wherein:

the plurality of service processes include at least two of:
(i) copying of the document data;
(ii) printing of the document data;
(iii) scanning of the document data;
(iv) facsimile of the document data;
(v) mail delivery of the document data;
(vi) storage in a repository of the document data;
(vii) reading in a repository of the document data;
(viii) OCR processing to the document data; and
(ix) noise elimination to the document data.

9. The service processing apparatus according to claim 1, wherein:

each of the plurality of service processes corresponds to each of the plurality of service processing apparatuses on a one for one basis.

10. The service processing apparatus according to claim 1, further comprising: a storing unit that stores a list of parallel-executable processes, wherein:

the interpretation unit determines whether at least two of the plurality of service processes instructed in the instruction data correspond to the parallel-executable processes in the list.

11. The service processing according to claim 1, further comprising:

a cooperative processing unit that sends the rewritten instruction data to the plurality of service processing apparatus to execute the plurality of service processes on the document data in parallel.

12. A service processing apparatus which is used with a setting unit and a generating unit, wherein:

a setting unit sets at least a location of document data and a content of a plurality of service processes to be executed on the document data, and sets a processing order of the plurality of service processes, the plurality of services being executed serially, executed in parallel, or executed both serially and in parallel on the basis of the processing order set by the setting unit; and a generating unit that generates, on the basis of settings made by the setting unit, instruction data instructing to execute the plurality of service processes on the document data in the processing order set by the setting unit, the setting including the location, the content of a plurality of service processes, and the processing order;

the service processing apparatus comprising:

a controller that:

(i) determines whether the instruction data includes instruction which instructs to execute a plurality of parallel-executable processes in serial;

(ii) rewrites the instruction data to instruct to execute the plurality of parallel-executable processes in parallel under the condition that the instruction data is determined to include instruction which instructs to execute a plurality of parallel-executable processes in serial; and (iii) controls, on the basis of the rewritten instruction data, a plurality of service processing apparatuses connected to a network to execute the plurality of service processes on the document data in parallel.

13. The service processing method according to claim 3 being performed by at least one processor.

* * * * *